United States Patent
Liu et al.

(10) Patent No.: US 12,401,757 B2
(45) Date of Patent: Aug. 26, 2025

(54) VIDEO GENERATION METHOD, VIDEO PLAYING METHOD, VIDEO GENERATION DEVICE, VIDEO PLAYING DEVICE, ELECTRONIC APPARATUS AND COMPUTER-READABLE STORAGE MEDIUM

(71) Applicant: Beijing Bytedance Network Technology Co., Ltd., Beijing (CN)

(72) Inventors: Ji Liu, Beijing (CN); Hong Zhang, Beijing (CN); Yinzhu Liu, Beijing (CN); Tao Sun, Beijing (CN); Lin Zhou, Beijing (CN); Hong Shen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/491,382

(22) Filed: Oct. 20, 2023

(65) Prior Publication Data
US 2024/0048665 A1     Feb. 8, 2024

Related U.S. Application Data

(63) Continuation of application No. 18/089,363, filed on Dec. 27, 2022, now Pat. No. 11,832,017, which is a
(Continued)

(30) Foreign Application Priority Data

Jul. 30, 2020   (CN) .......................... 202010753983.1

(51) Int. Cl.
*H04N 5/262* (2006.01)
*G11B 27/036* (2006.01)

(52) U.S. Cl.
CPC ......... *H04N 5/2624* (2013.01); *G11B 27/036* (2013.01); *H04N 5/2628* (2013.01)

(58) Field of Classification Search
CPC ... H04N 5/2624; H04N 5/2628; G11B 27/036
See application file for complete search history.

(56) References Cited

U.S. PATENT DOCUMENTS

| 8,190,588 B1 | 5/2012 | Gupta et al. |
| 8,370,395 B1 | 2/2013 | Gupta et al. |
| (Continued) | | |

FOREIGN PATENT DOCUMENTS

| CN | 107493441 A | 12/2017 |
| CN | 109168034 A | 1/2019 |
| (Continued) | | |

OTHER PUBLICATIONS

International Search Report and Written Opinion in PCT/CN2021/107665, mailed Oct. 20, 2021, 9 pages.
(Continued)

*Primary Examiner* — Mishawn N. Hunter
(74) *Attorney, Agent, or Firm* — Astute IP Law Group

(57) ABSTRACT

A video generation method, a video playing method, a video generation device, a video playing device, an electronic apparatus and a computer-readable storage medium are provided. The video generation method includes: acquiring a first video; performing an effect processing on the first video to obtain a second video; superimposing an dynamic effect on the second video to obtain a third video, wherein the dynamic effect comprises a dynamic image that presents a related information corresponding to the first video; and obtaining a fourth video based on the first video and the third video to generate a fourth video, wherein an image of the fourth video comprises a first image and a second image, the
(Continued)

first video comprises an image of the first video, and a second image comprises an image of the third video.

17 Claims, 6 Drawing Sheets

Related U.S. Application Data continuation of application No. PCT/CN2021/107665, filed on Jul. 21, 2021.

(56) References Cited

U.S. PATENT DOCUMENTS

| | | | |
|---|---|---|---|
| 2009/0006189 A1 | 1/2009 | Zhang et al. | |
| 2010/0205667 A1 | 8/2010 | Anderson et al. | |
| 2013/0169760 A1 | 7/2013 | Watts | |
| 2014/0362258 A1 | 12/2014 | Ichikawa et al. | |
| 2015/0082239 A1 | 3/2015 | Zhao et al. | |
| 2015/0089348 A1 | 3/2015 | Jose | |
| 2016/0353165 A1 | 12/2016 | Lee et al. | |
| 2017/0272807 A1 | 9/2017 | Moshiri et al. | |
| 2018/0109585 A1 | 4/2018 | Hirabayashi et al. | |
| 2019/0095075 A1 | 3/2019 | Yang | |
| 2019/0379876 A1 | 12/2019 | Hur et al. | |
| 2019/0387158 A1 | 12/2019 | Ono et al. | |
| 2020/0134377 A1 | 4/2020 | Attorre et al. | |
| 2020/0310600 A1* | 10/2020 | Xia | G06F 3/0482 |

FOREIGN PATENT DOCUMENTS

| | | |
|---|---|---|
| CN | 109640188 A | 4/2019 |
| CN | 110111125 A | 8/2019 |
| CN | 110446097 A | 11/2019 |
| CN | 110650304 A | 1/2020 |
| CN | 111314761 A | 6/2020 |
| JP | 2019062381 A | 4/2019 |

OTHER PUBLICATIONS

Extended European Search Report in EP21850417.3, mailed Oct. 18, 2023, 8 pages.
Communication pursuant to Article 94(3) EPC for European Patent Application No. 21850417.3, mailed on Dec. 23, 2024, 7 pages.
Communication pursuant to Article 94(3) EPC for European Patent Application No. 21850417.3, mailed on Jun. 4, 2024, 7 pages.

* cited by examiner

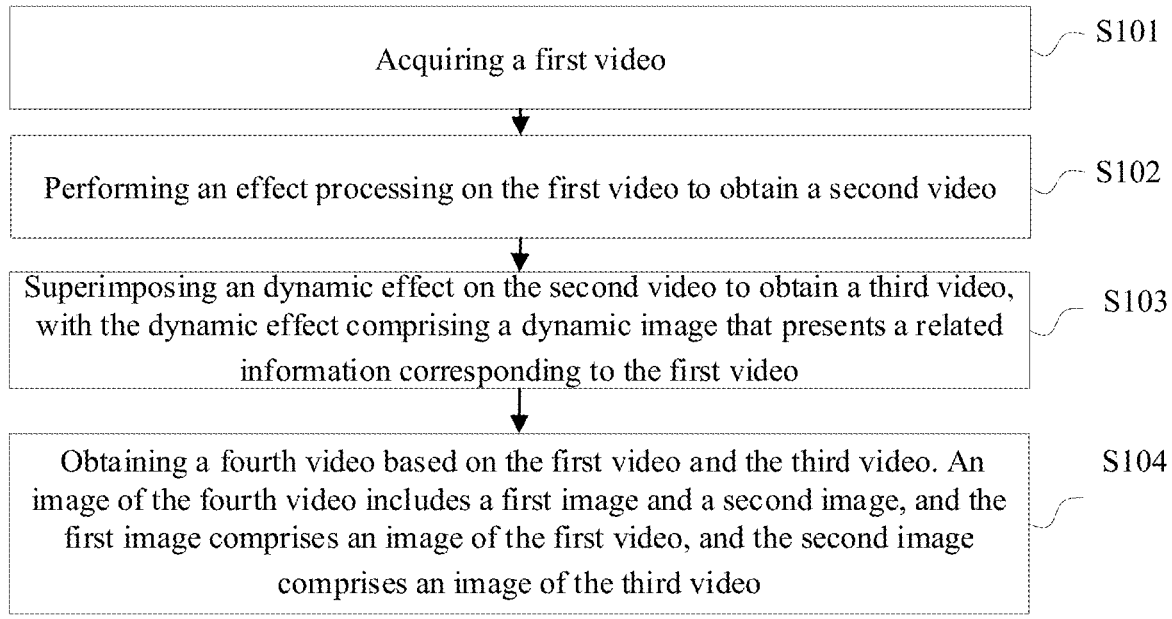

Fig. 1

Playing an original video in a display interface of an information flow, and playing a fourth video in the display interface of the information flow in response to meeting a predetermined condition; an image of the fourth video includes a first image and a second image, the first image comprises an image of a first video and the second image comprises an image of a third video; the first video is a video obtained by adjusting a size of an original video according to a preset size; a second video is a video obtained by performing an effect processing on the first video; the third video is a video obtained by superimposing an dynamic effect on the second video, and the dynamic effect is a dynamic image that presents a related information corresponding to the first video; and the fourth video is a video obtained based on splicing each image of the first video with each image of the third video.

VIDEO GENERATION METHOD, VIDEO PLAYING METHOD, VIDEO GENERATION DEVICE, VIDEO PLAYING DEVICE, ELECTRONIC APPARATUS AND COMPUTER-READABLE STORAGE MEDIUM

CROSS-REFERENCE TO RELATED APPLICATION

The application is a continuation application of U.S. patent application Ser. No. 18/089,363 filed on Dec. 27, 2022, which is a continuation application of International Patent Application No. PCT/CN2021/107665, filed on Jul. 21, 2021, which claims priority to Chinese patent application No. 202010753983.1, filed on Jul. 30, 2020, the entire disclosures of which are incorporated by reference as a part of the present application.

TECHNICAL FIELD

The present disclosure relates to a technical field of video processing, and particularly to a video generation method and a video playing method, a video generation device, a video playing device, an electronic apparatus and a computer-readable storage medium.

BACKGROUND

With the continuous development of Internet technology, users receive more and more fragmented information, especially the same information flow, which makes the users feel very boring when browsing. Therefore, video can be added to the information flow to attract the users to click.

SUMMARY

In a first aspect, provided is a video generation method, including: acquiring a first video; performing an effect processing on the first video to obtain a second video; superimposing an dynamic effect on the second video to obtain a third video, with the dynamic effect comprising a dynamic image that presents a related information corresponding to the first video; and obtaining a fourth video based on the first video and the third video, with an image of the fourth video including a first image and a second image, the first image comprising an image of the first video and the second image area comprising an image of the third video.

In a second aspect, provided is a video playing method, including: playing an original video in a display interface of an information flow, and playing a fourth video in the display interface of the information flow in response to meeting a predetermined condition, with an image of the fourth video including a first image and a second image, the first image comprising an image of a first video and the second image area comprising an image of a third video; wherein the first video is a video obtained by adjusting a size of an original video according to a preset size; a second video is a video obtained by performing an effect processing on the first video; the third video is a video obtained by superimposing an dynamic effect on the second video, and the dynamic effect is a dynamic image that presents a related information corresponding to the first video; and the fourth video is a video obtained based on the first video and the third video.

In a third aspect, provided is a video generation device, including: an acquisition module, configured to acquire a first video; a processing module, configured to perform an effect processing on the first video to obtain a second video; a superimposition module, configured to superimpose an dynamic effect on the second video to obtain a third video; wherein the dynamic effect comprises a dynamic image that presents a related information corresponding to the first video; and a splicing module, configured to obtaining a fourth video based on the first video and the third video; wherein an image of the fourth video includes a first image and a second image, and the first image comprises an image of the first video, and the second image comprises an image of the third video.

In a fourth aspect, provided is a video playing device, including: a playing module, configured to play an original video in a display interface of an information flow, and play a fourth video in the display interface of the information flow in response to meeting a predetermined condition; wherein an image of the fourth video includes a first image and a second image, the first image comprises an image of a first video, and the second image comprises an image of a third video; and wherein the first video is a video obtained by adjusting a size of an original video according to a preset size; a second video is a video obtained by performing an effect processing on the first video; the third video is a video obtained by superimposing an dynamic effect on the second video, and the dynamic effect is a dynamic image that presents a related information corresponding to the first video; and the fourth video is a video obtained based on the first video and the third video.

In a fifth aspect, provided is an electronic apparatus, including: a memory; and
   one or more application programs; and the one or more application programs are stored in the memory and configured to be executed by one or more processors, and the one or more programs are configured to execute the above video generation and playing method.

In a sixth aspect, a computer-readable storage medium is provided, a computer program is stored on the computer-readable storage medium, and while the computer program is executed by a processor, the above video generation and playing method are implemented.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numerals refer to the same or similar elements. It should be understood that the drawings are schematic and the originals and elements are not necessarily drawn to scale.

FIG. 1 is a schematic flowchart of a video generation method provided by an embodiment of the present disclosure;

FIG. 2 is a schematic flowchart of a video playing method provided by an embodiment of the present disclosure;

DETAILED DESCRIPTION

Figure 3A:
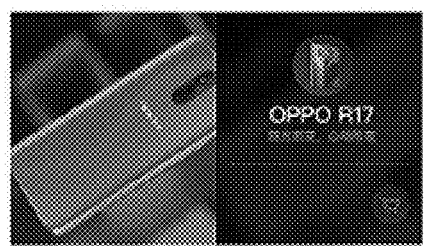
FIG. 3(*a*)- to FIG. 3(*f*) are a group of change state reference diagrams of a video playing process provided by an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as limited to the embodiments set forth here. On the contrary, these embodiments are provided for a more thorough and complete understanding of the present disclosure. It should be understood that the drawings and embodiments of the present disclosure are only for illustrative purposes, and are not intended to limit the scope of protection of the present disclosure.

It should be understood that the steps described in the method embodiments of the present disclosure can be performed in different order and/or in parallel. In addition, the method embodiments may include an additional step and/or omit an illustrated step. The scope of the present disclosure is not limited in this respect.

As used herein, the term "including" or "comprising" and variations thereof are open-ended inclusions, such as "including but not limited to". The term "on the basis of" means "based at least in part". The term "one embodiment" means "at least one embodiment". The term "another embodiment" means "at least one additional embodiment". The term "some embodiments" means "at least some embodiments". Relevant definitions of other terms will be given in the following description.

It should be noted that the concepts such as "first" and "second" mentioned in the present disclosure are only used to distinguish devices, modules or units, and are not used to limit that these devices, modules or units must be different devices, modules or units, nor to limit the order or interdependence of the functions performed by these devices, modules or units.

It should be noted that the modifiers such as "one" and "a plurality of" mentioned in the present disclosure are illustrative rather than restrictive, and those skilled in the art should understand that, unless otherwise clearly indicated in the context, they should be understood as "one or more".

Names of messages or information exchanged between a plurality of devices in the present disclosure are only for illustrative purposes, and are not intended to limit the scope of these messages or information.

In order to make the purpose, technical scheme and advantages of the present disclosure clearer, the embodiments of the present disclosure will be described in further detail below with reference to the accompanying drawings.

In the related technology, the process of adding a video to the information flow is relatively rough, which can't meet the user's viewing requirements.

The present disclosure provides a video generation and playing method, a device, an electronic apparatus and a computer-readable storage medium, which are used for solving the technical problem of how to meet the user's viewing requirements.

The technical solution provided by the present disclosure has the beneficial effects as follows:

According to the present disclosure, a second video is obtained by performing an effect processing on a first video, and a third video is obtained by superimposing a dynamic image that presents a related information corresponding to the first video, so that the obtained video is more interesting and attracts the users to click. Further, an image of a fourth video comprises a first image comprising an image of the first video and the second image comprising an image of the third video, so that the users can simultaneously watch content of the first video and dynamic effect content, thereby further improving the user's viewing experience.

The video generation method, the device, the electronic apparatus and the computer readable storage medium provided by the present disclosure aim to solve the above technical problems of the existing technology.

The technical solution of the present disclosure and how the technical solution of the present disclosure solves the above technical problems will be explained in detail with specific embodiments below. The following specific embodiments can be combined with each other, and the same or similar concepts or processes may not be described in detail in some embodiments. Embodiments of the present disclosure will be described below with reference to the accompanying drawings.

Embodiments of the present disclosure provide a video generation method, which may be applied to a server. As shown in FIG. 1, the method includes:

Step S101: acquiring a first video.

The first video may be a video acquired from the server, a video stored locally in a terminal, an advertisement video, or a news video. It should be noted that the present disclosure does not limit a source of the first video and video content of the first video.

In an embodiment of the present disclosure, the step S101 includes:

adjusting a size of an original video according to a preset size to acquire the first video.

The present disclosure also does not limit the source of the original video and video content of the original video, but it should be noted that the content in the original video is identical to that in the first video.

It can be understood that in a display interface of an information flow, if a video is displayed in the display interface of the information flow, the preset size may be determined on the basis of various display modes of the video, such as full screen display, landscape display or portrait display, and may also be determined on the basis of a video display area of the information flow.

Specifically, in one embodiment of the present disclosure, in order to allow the video size to match the video display area of the information flow, the size of the original video may be adjusted on a server side on the basis of the video display area of the information flow.

In an embodiment of the present disclosure, in order to allow the number of the video played in the video display area of the information flow to be an integer, the preset size may be matched with a proportion of a size of the video display area of the information flow. Specifically, the preset size may be determined proportionally according to the size of the video display area of the information flow.

Step S102: performing an effect processing on the first video to obtain a second video.

Step S103: superimposing a dynamic effect on the second video to obtain a third video, with the dynamic effect comprising a dynamic image that presents a related information corresponding to the first video.

Understandably, it is assumed that when a plurality of videos are displayed in the video display area of the information flow, the effect processing may be executed in any video, and then a new video can be superimposed, which makes the user's viewing experience richer.

In an embodiment of the present disclosure, the effect processing comprises a Gaussian blur special effect processing.

In an embodiment of the present disclosure, the dynamic effect may be superimposed on the second video that is obtained after the effect processing, so as to obtain a third video. And, the dynamic effect is a dynamic image that presents the related information corresponding to the first video.

In an embodiment of the present disclosure, the dynamic effect may be obtained by:

acquiring the related information, and determining a display mode of the related information, a display area of the related information and a display time of the related information; and obtaining the dynamic effect according to the related information, the display mode of the related information, the display area of the related information and the display time of the related information.

The related information of the first video may include video content in the first video, and the video content in the first video is presented with the dynamic effect to obtain the dynamic effect.

Specifically, the related information of the first video includes a source material in the first video. It can be understood that, taking the first video including an advertisement video as an example, in the case where the first video includes the advertisement video, the source material corresponding to the advertisement video can be acquired from a background of an advertisement system.

Then, according to the source material, the display mode of the source material in the video, the display area of the source material in the video and the display time of the source material in the video, the dynamic image presented by the source material in a dynamic effect is taken as the dynamic effect.

In an embodiment of the present disclosure, the display mode of the related information may be determined on the basis of a type of the related information or content of the related information.

Specifically, taking the first video including a mobile advertisement video as an example, the related information of the first video may include a mobile phone name, a mobile phone image, mobile phone description information, mobile phone sales and a mobile phone price (including an original price and a current price).

The related information may be displayed in a predetermined position of the mobile phone image, such as the mobile phone name is displayed in a center of the image. Also, the mobile phone description information, the mobile phone sales and the original price of the mobile phone may be displayed under the mobile phone name, and the mobile phone sales may be displayed in a rolling manner to attract the users to watch until a value of latest mobile phone sales is fixed. Furthermore, after displaying the original price of the mobile phone for a period, the original price of the mobile phone is replaced by the current price of the mobile phone at the position of original price of the mobile phone, in order to attract the users to click through an obvious price change.

In an embodiment of the present disclosure, the display mode of the related information may also be configured by itself.

Step S104: obtaining a fourth video based on the first video and the third video. An image of the fourth video includes a first image and a second image, and the first image comprises an image of the first video, and the second image comprises an image of the third video.

In an embodiment of the present disclosure, obtaining the fourth video based on the first video and the third video includes splicing an image of the first video with an image of the third video to obtain an image of the fourth video. For example, the fourth video is obtained by splicing each image of the first video with each image of the third video.

Understandably, the third video is a video with the effect obtained by performing the effect processing and the dynamic effect. In order to give the users a better viewing experience, that is, in order that the users can watch both the content of the original video and the content of the dynamic effect, an image of the first video and an image of the third video can be spliced to obtain an image of the fourth video. Understandably, a video size of the fourth video is matched with the size of the video display area of the information flow.

In an embodiment of the present disclosure, an image area of the fourth video displayed in the video display area of the information flow may include a first image area and a second image area, and area sizes of the first image area and the second image area may be the same or different. By displaying the image of the first video in the first image area and the image of the third video in the second image area, it can be realized to simultaneously watch the content of the original video and the content of the dynamic effect.

Specifically, a video size of the first video may be identical to a video size of the third video, that is, a width of the first video and a width of the third video are equal to a width of the video display area of the information flow, and a length of the first video and a length of the third video are equal to half of a length of the video display area of the information flow. By displaying the two videos in a same proportion, the user's viewing experience becomes better.

According to the present disclosure, the second video is obtained by performing the effect processing on the first video, and the third video is obtained by superimposing the dynamic image that presents the related information corresponding to the first video, so that the obtained video is more interesting and attracts the users to click, and the image of the fourth video is obtained by splicing an image of the third video and an image of the first video, so that the users can simultaneously watch the content of the first video and the content of the dynamic effect, and the user's viewing experience is further improved.

Embodiments of the present disclosure provide a video playing method, which is applied to a client side. As shown in FIG. 2, the method includes:

Step S201: playing an original video in a display interface of an information flow, and playing a fourth video in the display interface of the information flow in response to meeting a predetermined condition. An image of the fourth video includes a first image and a second image, the first image comprises an image of a first video and the second image comprises an image of a third video.

The first video is a video obtained by adjusting a size of an original video according to a preset size. A second video is a video obtained by performing an effect processing on the first video. The third video is a video obtained by superimposing an dynamic effect on the second video, and the dynamic effect is a dynamic image that presents a related information corresponding to the first video. The fourth video is a video obtained based on splicing each image of the first video with each image of the third video.

In an embodiment of the present disclosure, the predetermined condition includes: a playing time of the original video reaches a predetermined time, and/or a predetermined object is captured during the playing of the original video.

It can be understood that when the original video is played in the display interface of the information flow, the fourth video can be played in the display interface of the information flow and the fourth video can be played in a video display area of the display interface of the information flow in the case where the playing time of the original video reaches the predetermined time, such as 5 seconds.

Alternatively, taking the original video including a mobile advertisement video as an example, when a close-up picture of the mobile phone is played in the original video, it can be considered that the predetermined object has been captured, at this time, the fourth video can be played in the display area of the display interface of the information flow.

It should be noted that the fourth video is generated on the basis of the original video and the related information of the original video.

Specifically, the first video is obtained by adjusting a size of the original video according to a preset size. Then, the second video is obtained by performing effect processing on the first video. Then, the third video is obtained by superimposing an dynamic effect obtained according to the related information on the second video. Finally, the image of fourth video is obtained by splicing an image of the first video and an image of the third video.

The dynamic effect obtained according to the related information includes a dynamic image that presents the related information in a dynamic effect.

In an embodiment of the present disclosure, the dynamic effect may also be obtained according to the related information, a display mode of the related information, a display area of the related information and a display time of the related information.

Specifically, the related information of the first video includes a source material in the first video. It can be understood that, taking the first video including an advertisement video as an example, in the case where the first video includes the advertisement video, the source material corresponding to the advertisement video can be acquired from a background of an advertisement system.

The source material corresponding to the advertisement video includes a graphic logo avatar of a promotion object, a name of the promotion object, description information of the promotion object and network address information corresponding to the promotion object.

Take the first video including a mobile advertisement video as an example, the source material corresponding to the mobile advertisement video may include a mobile phone image, a mobile phone name, mobile phone description information, and a commodity purchase website corresponding to the mobile phone.

Through the above advertisement source material, a display mode of the source material, a display area of the source material and a display time of the source material can be determined, and then the dynamic effect of the mobile advertisement video can be generated.

In an embodiment of the present disclosure, the fourth video includes a first preset control, and the first preset control is configured to link to a network address corresponding to the related information. The video playing method further includes:

In a process of playing the fourth video, in response to receiving a trigger operation for the first preset control input by the user, acquiring a detailed information page corresponding to the related information on the basis of the network address and displaying the detailed information page.

It can be understood that, in the process of playing the fourth video, the first preset control is displayed. Taking the content in the fourth video including an advertisement video as an example, the first preset control may be a purchase button of a commodity displayed in the advertisement video, and after receiving a click operation of the user on the purchase button, a purchase detailed information page of the commodity can be displayed.

In an embodiment of the present disclosure, the first preset control may also be a download button of an application program displayed in an advertisement commodity, and after receiving the click operation of the user on the download button, a download detailed information page of the application program can be displayed.

By attracting the users to click on the first preset control, a conversion rate of commodity in the fourth video can be improved more effectively.

In an embodiment of the present disclosure, the fourth video includes a second preset control, and the second preset control is configured to close the fourth video. The video playing method further includes:

In the process of playing the fourth video, closing the fourth video in response to receiving a trigger operation for the second preset control input by the user.

It can be understood that, when the user is not satisfied with the fourth video or the user has already watched the fourth video, in order not to disgust the user, the second preset control (such as a close button) may be displayed in the process of playing the fourth video, and the fourth video may be closed when receiving a click operation of the close button input by the user, so as to improve the user's viewing experience.

According to the present disclosure, the original video is displayed in the video display interface of the information flow, and the fourth video is played in the video display area of the display interface of the information flow after the predetermined condition is met, and the fourth video is obtained on the basis of the related information of the original video, so that the generated video is more interesting, and attracts the users to watch and click, and further the users can pay attention to the related information.

As shown in FIG. 3, embodiments of the present disclosure provide a group of change state reference diagrams of a process of playing the fourth video.

Figure 3B:
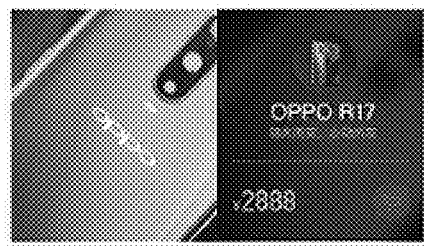
Figure 3C:
Figure 3D:
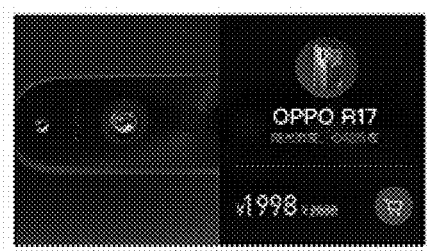
Figure 3E:
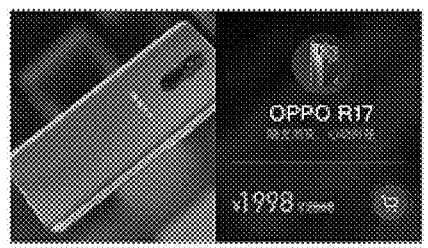
Figure 3F:

Specifically, take the original video including a mobile advertisement video as an example, in the process of playing the fourth video in FIG. 3(a)-FIG. 3(c), the fourth video is played in the video display area of the display interface of the information flow. In the video display interface, a left half of the video display interface plays the first video generated by cropping the original video with a preset size, and a right half of the video display interface plays the third video with the dynamic effect after Gaussian blur processing. In the video played on the right half, the mobile phone image, mobile phone name and mobile phone description information are fixed at the predetermined position, and a change state diagram of the original price and the current price is displayed below, which forms a visual impact on the user. In the process of playing the fourth video in FIG. 3(d)-FIG. 3(f), the first preset control such as the purchase button is displayed on a lower right side of a playing interface of the third video, and a ring effect is added around the button to attract the users to click. After receiving the user's click on the purchase button, the purchase detailed information page of the mobile phone can be displayed.

Figure 4:
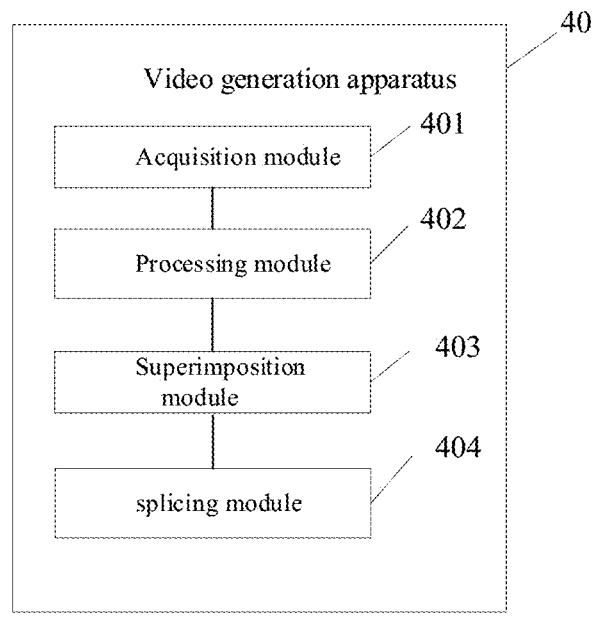
FIG. 4 is a schematic structural diagram of a video generation device provided by an embodiment of the present disclosure.

Embodiments of the present disclosure provide a video generation device, and the video generation device of the embodiments of the present disclosure may be located on a server side. As shown in FIG. 4, the video generation device 40 may include an acquisition module 401, a processing module 402, a superimposition module 403 and a splicing module 404.

The acquisition module 401 is configured to acquire a first video.

The first video may be a video acquired from the server, a video stored locally in a terminal, an advertisement video, or a news video. It should be noted that, the present disclosure does not limit a source of the first video and video content of the first video.

In an embodiment of the present disclosure, the acquisition module 401 includes:
an adjustment sub-module, which is configured to adjust a size of an original video according to a preset size to acquire the first video.

The present disclosure also does not limit a source of the original video and video content of the original video, but it should be noted that, the content of the original video is identical to that in the first video.

It can be understood that, in a display interface of an information flow, if a video is displayed in the display interface of the information flow, the preset size may be determined on the basis of the display mode of the video, such as full screen display, landscape display or portrait display, and may also be determined on the basis of a video display area of the information flow.

Specifically, in one embodiment of the present disclosure, in order to allow the video size to match the video display area of the information flow, the size of the original video may be adjusted on a server side on the basis of the video display area of the information flow.

In an embodiment of the present disclosure, in order to allow the number of the video played in the video display area of the information flow to be an integer, the preset size may be matched with a proportion of a size of the video display area of the information flow. Specifically, the preset size may be determined proportionally according to the size of the video display area of the information flow.

The processing module 402 is configured to execute an effect processing on the first video to obtain a second video.

The superimposition module 403 is configured to superimpose an dynamic effect on the second video to obtain a third video. The dynamic effect is a dynamic image that presents a related information corresponding to the first video in a dynamic effect.

Understandably, it is assumed that when a plurality of videos are displayed in the video display area of the information flow, the effect processing may be performed on any video, and then a new video can be superimposed, which makes the user's viewing experience richer.

In an embodiment of the present disclosure, the dynamic effect may be superimposed on the second video that is obtained after the effect processing, so as to generate a third video. And, the dynamic effect is a dynamic image that presents the related information corresponding to the first video in the dynamic effect.

In an embodiment of the present disclosure, the superimposition module for obtaining the dynamic effect thereof includes:
an acquisition sub-module, which is configured to acquire the related information, and determine a display mode of the related information, a display area of the related information and a display time of the related information;
an generation sub-module, which is configured to generate the dynamic effect according to the related information, the display mode of the related information, the display area of the related information and the display time of the related information.

The related information of the first video may include video content in the first video, and the video content in the first video is presented with the dynamic effect to generate the dynamic effect.

Specifically, the related information of the first video includes a source material in the first video. It can be understood that, taking the first video including an advertisement video as an example, in the case where the first video includes the advertisement video, the source material corresponding to the advertisement video can be acquired from a background of an advertisement system.

Then, according to the source material, the display mode of the source material in the video, the display area of the source material in the video and the display time of the source material in the video, the dynamic image of the source material presented in a dynamic effect is taken as the dynamic effect.

In an embodiment of the present disclosure, the generation sub-module includes:
a determination unit, which is configured to determine the display mode of the related information on the basis of a type of the related information or content of the related information.

Specifically, taking the first video including a mobile phone advertisement video as an example, the related information of the first video may include a mobile phone name, a mobile phone image, mobile phone description information, mobile phone sales and a mobile phone price (including an original price and a current price).

The related information may be displayed in a predetermined position of the mobile phone image, such as mobile phone name is displayed in a center of the image. And, the mobile phone description information, the mobile phone sales and the original price of the mobile phone may be displayed under the mobile phone name, and the mobile phone sales may be displayed in a rolling manner to attract the users to watch until a latest mobile phone sales is fixed. Further, after displaying the original price of the mobile phone for a period of time, the original price of the mobile phone is replaced by the current price of the mobile phone at the position of original price of the mobile phone, in order to attract the users to click through an obvious price change.

In an embodiment of the present disclosure, the display mode of the related information may also be configured by itself.

The splicing module 404 is configured to splice an image of the first video with an image of the third video to generate an image of a fourth video; wherein an image of the fourth video includes a first image and a second image, and the first image comprises an image of the first video, and the second image comprises an image of the third video.

Understandably, the third video is a video with the effect obtained by performing the effect processing and the dynamic effect. In order to give the users a better viewing experience, that is, in order that the users can watch both the content of the original video and the content of dynamic effect, an image of the first video and an image of the third video can be spliced to obtain the fourth video. For example, images of the first video and images of the third video may be spliced in one-to-one correspondence to obtain corresponding images of a fourth video. Understandably, a video size of the fourth video is matched with the size of the video display area of the information flow.

In an embodiment of the present disclosure, an image area of the fourth video displayed in the video display area of the information flow may include a first image area and a second image area, wherein area sizes of the first image area and the second image area may be the same or different. By displaying the image of the first video in the first image area and the image of the third video in the second image area, it can be realized to simultaneously watch the content of the original video and the content of the dynamic effect.

Specifically, a video size of the first video may be allowed to be identical to a video size of the third video, that is, a width of the first video and a width of the third video are equal to a width of the video display area of the information flow, and a length of the first video and a length of the third video are equal to half of a length of the video display area of the information flow. By displaying the two videos in a same proportion, the user's viewing experience becomes better.

According to the present disclosure, the second video is obtained by performing the effect processing on the first video, and the third video is obtained by superimposing the dynamic image that presents the related information corresponding to the first video, so that the obtained video is more interesting and attracts the users to click, and the fourth video is obtained by splicing the third video with the first video, so that the users can simultaneously watch the content of the first video and the content of the dynamic effect, and the user's viewing experience is further improved.

Figure 5:
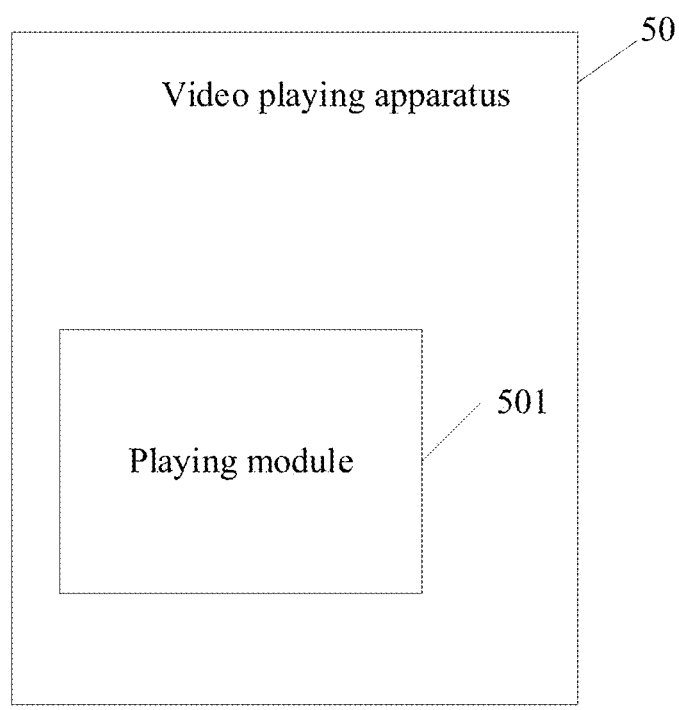
FIG. 5 is a schematic structural diagram of a video playing device provided by an embodiment of the present disclosure.

Embodiments of the present disclosure provide a structural schematic diagram of a video playing device, in which the video playing device of the embodiments of the present disclosure may be located on a client side. As shown in FIG. 5, the video playing device 50 may include a playing module 501.

The playing module 501 is configured to play an original video in a display interface of an information flow, and play a fourth video in the display interface of the information flow in response to meeting a predetermined condition. An image of the fourth video includes a first image and a second image, the first image comprises an image of a first video and the second image comprises an image of a third video.

The first video is a video obtained by adjusting a size of an original video according to a preset size. A second video is a video obtained by performing effect processing on the first video. The third video is a video obtained by superimposing an dynamic effect on the second video, and the dynamic effect is a dynamic image that presents a related information corresponding to the first video in a dynamic effect. The fourth video is a video obtained by splicing each image of the first video with each image of the third video.

In an embodiment of the present disclosure, the predetermined condition includes: a playing time of the original video reaches a predetermined time, and/or a predetermined object is captured during the playing of the original video.

It can be understood that, when the original video is played in the display interface of the information flow, the fourth video can be played in the display interface of the information flow and the fourth video can be played in a video display area of the display interface of the information flow in the case where the playing time of the original video reaches the predetermined time, such as 5 seconds.

Alternatively, taking the original video including a mobile advertisement video as an example, when a close-up picture of the mobile phone is played in the original video, it can be considered that the predetermined object has been captured, and then the fourth video can be played in the display area of the display interface of the information flow.

It should be noted that, the fourth video is generated on the basis of the original video and the related information of the original video.

Specifically, the first video is obtained by adjusting a size of the original video according to a preset size. Then, the second video is obtained by performing an effect processing on the first video. Then, the third video is obtained by superimposing an dynamic effect obtained according to the related information on the second video. Finally, the fourth video is obtained by splicing each image of the first video with each image of the third video.

The dynamic effect obtained according to the related information includes a dynamic image that presents the related information in a dynamic effect.

In an embodiment of the present disclosure, the dynamic effect may also be obtained according to the related information, a display mode of the related information, a display area of the related information and a display time of the related information.

Specifically, the related information of the first video includes a source material in the first video. It can be understood that, taking the first video including an advertisement video as an example, in the case where the first video includes the advertisement video, the source material corresponding to the advertisement video can be acquired from a background of an advertisement system.

The source material corresponding to the advertisement video includes a graphic logo avatar of a promotion object, a name of the promotion object, description information of the promotion object and network address information corresponding to the promotion object.

Take the first video including a mobile advertisement video as an example, the source material corresponding to the mobile phone advertisement video may include a mobile phone image, a mobile phone name, mobile phone description information, and a commodity purchase website corresponding to the mobile phone.

Through the above advertisement source material, a display mode of the source material, a display area of the source material and a display time of the source material can be determined, and then the dynamic effect of the mobile advertisement video can be generated.

In an embodiment of the present disclosure, the fourth video includes a first preset control, and the first preset control is configured to link to a network address corresponding to the related information. The playing module further includes:

a display sub-module, which is configured to acquire a detailed information page corresponding to the related information on the basis of the network address and display the detailed information page in response to receiving a trigger operation for the first preset control input by the user in a process of playing the fourth video.

It can be understood that, in the process of playing the fourth video, the first preset control is displayed. Taking the content in the fourth video including an advertisement video as an example, the first preset control may be a purchase button of a commodity displayed in the advertisement video, and after receiving a click operation of the user on the purchase button, a purchase detailed information page of the commodity can be displayed.

In an embodiment of the present disclosure, the first preset control may also be a download button of an application program displayed in an advertisement commodity, and after receiving the click operation of the user on the download button, a download detailed information page of the application program can be displayed.

By attracting the users to click on the first preset control, a conversion rate of the commodity in the fourth video can be improved more effectively.

In an embodiment of the present disclosure, the fourth video includes a second preset control, and the second preset control is configured to close the fourth video. The playing module further includes:

a closing sub-module, which is configured to close the fourth video in response to receiving a trigger operation for the second preset control input by the user in the process of playing the fourth video.

It can be understood that, when the user is not satisfied with the fourth video or has already watched the fourth video, in order not to disgust the user, the second preset control (such as a close button) may be displayed in the process of playing the fourth video, and the fourth video may be closed when receiving a click operation of the close button input by the user, so as to improve the user's viewing experience.

According to the present disclosure, the original video is displayed in the video display interface of the information flow, and the fourth video is played in the video display area of the display interface of the information flow after the predetermined condition is met, and the fourth video is generated on the basis of the related information of the original video, so that the generated video is more interesting, and attracts the users to watch and click, and further the users can pay attention to the related information.

Figure 6:
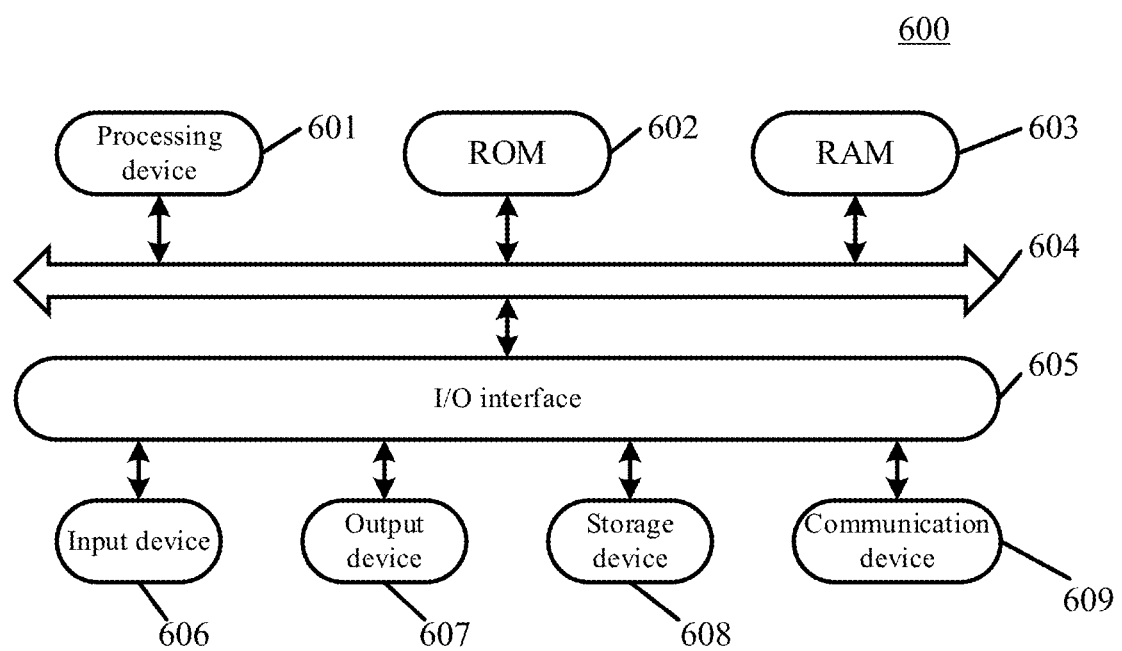
FIG. 6 is a schematic structural diagram of an electronic apparatus provided by an embodiment of the present disclosure.

Next, referring to FIG. 6, which illustrates a schematic structural diagram of an electronic apparatus 600 suitable for implementing the embodiments of the present disclosure. The electronic apparatus in the embodiments of the present disclosure may include, but is not limited to, a mobile terminal such as a mobile phone, a notebook computer, a digital broadcast receiver, a PDA (personal digital assistant), a PAD (tablet computer), a PMP (portable multimedia player), a vehicle-mounted terminal (for example, a vehicle navigation terminal), or a fixed terminal such as a digital TV, a desktop computer, or the like. The electronic apparatus shown in FIG. 6 is only an example, and should not cause any limitation to the functions and application scope of the embodiments of the present disclosure.

The electronic apparatus includes a memory and a processor. The processor here may be referred to as a processing device 601 described below, and the memory may include at least one of a read-only memory (ROM) 602, a random access memory (RAM) 603 and a storage device 608, the details are described as follows.

As shown in FIG. 6, the electronic apparatus 600 may include a processing device (for example, a central processing unit, a graphics processing unit, etc.) 601, which may perform various appropriate actions and processes according to a program stored in the read-only memory (ROM) 602 or a program loaded from the storage device 608 into the random access memory (RAM) 603. Various programs and data required for the operation of the electronic apparatus 600 are further stored in the RAM 603. The processing device 601, the ROM 602, and the RAM 603 are connected to each other through a bus 604. An input or output (I/O) interface 605 is also connected to the bus 604.

Generally, the following devices may be connected to the I/O interface 605: an input device 606 including, for example, a touch screen, a touch panel, a keyboard, a mouse, a camera, a microphone, an accelerometer, a gyroscope, or the like; an output device 607 including, for example, a liquid crystal display (LCD), a speaker, a vibrator, or the like; a storage device 608 including, for example, a magnetic tape, a hard disk, or the like; and a communication device 609. The communication device 609 may allow the electronic apparatus 600 to perform wireless or wired communication with other devices to exchange data. Although FIG. 6 illustrates an electronic apparatus 600 with various devices, it should be understood that, it is not required to implement or have all the illustrated devices. More or fewer devices may be alternatively implemented or provided. Particularly, according to the embodiments of the present disclosure, the process described above with reference to the flowchart can be implemented as a computer software program. For example, an embodiment of the present disclosure includes a computer program product, which includes a computer program carried on a non-transient computer-readable medium, and the computer program contains program code for executing the method illustrated in the flowchart. In such an embodiment, the computer program can be downloaded and installed from a network through the communication device 609, or installed from the storage device 608 or the ROM 602. When the computer program is executed by the processing device 601, the above functions defined in the method of the embodiments of the present disclosure are performed.

It should be noted that, the above-mentioned computer-readable medium of the present disclosure may be a computer-readable signal medium or a computer-readable storage medium or any combination of the above two. The computer-readable storage medium may be, for example, but not limited to, electronic, magnetic, optical, electromagnetic, infrared, or semiconductor system, device or component, or a combination of any of the above. More specific examples of the computer-readable storage medium may include, but are not limited to, an electrical connection with one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that can be used by or in connection with an instruction execution system, apparatus or device. While in the present disclosure, the computer-readable signal medium may include a data signal propagated in base band or as part of a carrier wave, and computer-readable program codes are carried in the data signal. This propagated data signal can take various forms, including but not limited to, electromagnetic signal, optical signal or any suitable combination of the above. The computer-readable signal medium may also be any computer-readable medium other than the computer-readable storage medium, and the computer-readable signal medium can send, propagate or transport a program for being used by or in connection with the instruction execution system, apparatus or device. The program code contained on the computer-readable medium can be transmitted by any suitable medium, including but not limited to, electric wire, optical cable, RF (radio frequency), etc., or any suitable combination of the above.

In some embodiments, the client and the server can communicate by using any currently known or future developed network protocol such as HTTP (HyperText Transfer Protocol), and can be interconnected with digital data communication (for example, a communication network) in any form or medium. Examples of the communication network include a local area network ("LAN"), a wide area network ("WAN"), an Internet network (for example, the Internet) and an end-to-end network (for example, ad hoc end-to-end network), as well as any currently known or future developed network.

The above-described computer-readable medium may be included in the above-described electronic apparatus; Alternatively, the computer-readable medium may exist independently without being assembled into the electronic apparatus.

The above-described computer-readable medium carries one or more programs. When the above one or more programs are executed by the electronic apparatus, the electronic apparatus is caused to:
acquire a first video;
performing an effect processing on the first video to obtain a second video;
superimpose an dynamic effect on the second video to obtain a third video, with the dynamic effect comprising a dynamic image that presents a related information corresponding to the first video; and
obtaining a fourth video based on the first video and the third video, with an image of the fourth video including a first image and a second image, and the first image area comprising an image of the first video, and the second image comprising an image of the third video.

Alternatively, the above computer-readable medium carries one or more programs. When the above one or more programs are executed by the electronic apparatus, the electronic apparatus is caused to:
play an original video in a display interface of an information flow, and play a fourth video in the display interface of the information flow in response to meeting a predetermined condition; with an image of the fourth video including a first image and a second image, the first image comprising an image of a first video, and the second image comprising an image of a third video.

The first video is a video obtained by adjusting a size of an original video according to a preset size. A second video is a video obtained by performing an effect processing on the first video. The third video is a video generated by superimposing an dynamic effect on the second video, and the dynamic effect is a dynamic image that presents a related information corresponding to the first video in a dynamic effect. The fourth video is a video obtained by splicing each image of the first video with each image of the third video.

The computer program codes for performing operations of the present disclosure may be written in one or more programming languages or their combinations, including, but not limited to, object-oriented programming languages such as Java, Smalltalk, C++, and conventional procedural programming languages such as "C" language or similar programming languages. The program codes may be executed completely on the user's computer, executed partially on the user's computer, executed as an independent software package, executed partially on the user's computer and partially on a remote computer, or executed completely on a remote computer or server. In the case of relating to the remote computer, the remote computer may be connected to the user's computer through any kind of network, including a local area network (LAN) or a wide area network (WAN), or may be connected to an external computer (for example, using an Internet service provider to provide the connection through the Internet).

The flowchart and block diagram in the drawings illustrate the architecture, functions and operations of possible implementations of systems, methods and computer program products according to various embodiments of the present disclosure. In this regard, each block in the flowchart or block diagram may represent a module, a program segment, or a part of code, which contains one or more executable instructions for implementing the specified logical functions. It should also be noted that, in some alternative implementations, the functions marked in the blocks may also occur in a different order than those marked in the drawings. For example, two consecutive blocks can actually be executed basically in parallel, and sometimes they can be executed in reverse order, depending on the functions involved. It should also be noted that, each block in the block diagram and/or flowchart, and the combination of blocks in the block diagram and/or flowchart, can be implemented by a dedicated hardware-based system that performs specified functions or operations, or can be implemented by a combination of dedicated hardware and computer instructions.

The modules or units involved in the embodiments described in the present disclosure may be implemented by software, and may also be implemented by hardware. In some cases, a name of the module or the unit does not constitute a limitation to the unit itself.

The functions described above herein may be at least partially performed by one or more hardware logic components. For example, without limitation, exemplary types of hardware logic components that can be used include: field programmable gate array (FPGA), application specific integrated circuit (ASIC), application Specific standard product (ASSP), system-on-chip (SOC), complex programmable logic device (CPLD), etc.

In the context of the present disclosure, a machine-readable medium may be a tangible medium that may contain or store a program for being used by or in connection with an instruction execution system, apparatus or device. The machine-readable medium may be a machine-readable signal medium or a machine-readable storage medium. The machine-readable medium may include, but are not limited to, electronic, magnetic, optical, electromagnetic, infrared, or semiconductor system, apparatus or device, or any suitable combination of the above. More specific examples of the machine-readable storage medium may include an electrical connection on the basis of one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

According to one or more embodiments of the present disclosure, provided is a video generation method, including:
acquiring a first video;
performing an effect processing on the first video to obtain a second video;
superimposing an dynamic effect on the second video to obtain a third video, with the dynamic effect comprising a dynamic image that presents a related information corresponding to the first video; and obtaining a fourth video based on the first video and the third video to obtain a fourth video, with an image of the fourth video including a first image and a second image, and the first image comprising an image of the first video and the second image comprising an image of the third video.

In an embodiment of the present disclosure, acquiring the first video includes:

adjusting a size of an original video according to a preset size to acquire the first video.

In an embodiment of the present disclosure, the dynamic effect is obtained by:

acquiring the related information, and determining a display mode of the related information, a display area of the related information and a display time of the related information; and obtaining the dynamic effect according to the related information, the display mode of the related information, the display area of the related information and the display time of the related information.

In an embodiment of the present disclosure, the method includes:

determining the display mode of the related information on the basis of a type of the related information or content of the related information.

In an embodiment of the present disclosure, a video size of the fourth video is matched with a size of a video display area of an information flow.

According to one or more embodiments of the present disclosure, provided is a video playing method, including:

playing an original video in a display interface of an information flow, and playing a fourth video in the display interface of the information flow in response to meeting a predetermined condition, with an image area of the fourth video including a first image area and a second image area, the first image area being configured to display an image of the first video, and the second image area being configured to display an image of the third video.

The first video is a video obtained by adjusting a size of an original video according to a preset size. A second video is a video obtained by performing an effect processing on the first video. The third video is a video generated by superimposing an dynamic effect on the second video, and the dynamic effect is a dynamic image that presents a related information corresponding to the first video in a dynamic effect. The fourth video is a video obtained by splicing the first video with the third video.

In an embodiment of the present disclosure, the predetermined condition includes: a playing time of the original video reaches a predetermined time, and/or a predetermined object is captured during the playing of the original video.

In an embodiment of the present disclosure, the fourth video comprises a first preset control, and the first preset control is configured to link to a network address corresponding to the related information, and the method further includes:

in a process of playing the fourth video, in response to receiving a trigger operation for the first preset control input by a user, acquiring a detailed information page corresponding to the related information on the basis of the network address and displaying the detailed information page.

In an embodiment of the present disclosure, the fourth video includes a second preset control, and the second preset control is configured to close the fourth video, and the method further includes:

in the process of playing the fourth video, closing the fourth video in response to receiving a trigger operation for the second preset control input by a user.

According to one or more embodiments of the present disclosure, provided is a video generation device, including:

an acquisition module, which is configured to acquire a first video;

a processing module, which is configured to perform an effect processing on the first video to obtain a second video;

a superimposition module, which is configured to superimpose an dynamic effect on the second video to obtain a third video; and the dynamic effect is a dynamic image that presents a related information corresponding to the first video; and a splicing module, which is configured to obtain a fourth video based on the first video and the third video to generate a fourth video; and an image of the fourth video includes a first image and a second image, and the first image comprises an image of the first video, and the second image comprises an image of the third video.

In an embodiment of the present disclosure, the acquisition module includes:

an adjustment sub-module, which is configured to adjust a size of an original video according to a preset size to acquire the first video.

In an embodiment of the present disclosure, the superimposition module for generating the dynamic effect thereof includes:

an acquisition sub-module, which is configured to acquire the related information, and determine a display mode of the related information, a display area of the related information and a display time of the related information.

an generation sub-module, which is configured to obtain the dynamic effect according to the related information, the display mode of the related information, the display area of the related information and the display time of the related information.

In an embodiment of the present disclosure, the generation sub-module includes:

a determination unit, which is configured to determine the display mode of the related information on the basis of a type of the related information or content of the related information.

In an embodiment of the present disclosure, a video size of the fourth video is matched with a size of a video display area of the information flow.

According to one or more embodiments of the present disclosure, a video playing device providing a video playing method according to one or more embodiments of the present disclosure is provided, and the video playing device includes:

a playing module, which is configured to play an original video in a display interface of an information flow, and play a fourth video in the display interface of the information flow in response to meeting a predetermined condition; and an image of the fourth video includes a first image and a second image, the first image comprises an image of a first video and the second image comprises an image of a third video.

The first video is a video obtained by adjusting a size of an original video according to a preset size. A second video is a video obtained by performing an effect processing on the first video. The third video is a video generated by superimposing an dynamic effect on the second video, and the dynamic effect is a dynamic image that presents a related information corresponding to the first video. The fourth video is a video obtained by splicing each image of the first video with each image of the third video.

In an embodiment of the present disclosure, the predetermined condition includes: a playing time of the original video reaches a predetermined time, and/or a predetermined object is captured during the playing of the original video.

In an embodiment of the present disclosure, the fourth video includes a first preset control, and the first preset control is configured to link to a network address corresponding to the related information. The playing module further includes:

an display sub-module, which is configured to acquire a detailed information page corresponding to the related information on the basis of the network address and display the detailed information page in response to receiving a trigger operation for the first preset control input by the user in a process of playing the fourth video.

In an embodiment of the present disclosure, the fourth video includes a second preset control, and the second preset control is configured to close the fourth video. The playing module further includes:

an closing sub-module, which is configured to close the fourth video in response to receiving a trigger operation for the second preset control input by the user in the process of playing the fourth video.

According to one or more embodiments of the present disclosure, provided is an electronic device, including:
one or more processors;
a memory; and
one or more application programs, wherein the one or more application programs are stored in the memory and configured to be executed by the one or more processors, and the one or more programs are configured to execute the above video generation and playing method.

According to one or more embodiments of the present disclosure, a computer-readable storage medium is provided, and a computer program is stored on the computer-readable storage medium, and the computer-readable storage medium is characterized in that, when the computer program is executed by the processor, the above video generation and playing method are implemented.

The above description is only the preferred embodiment of the present disclosure and the explanation of the applied technical principle. It should be understood by those skilled in the art that, the disclosure scope involved in present disclosure is not limited to the technical solutions formed by the specific combination of the above technical features, but also covers other technical solutions formed by any combination of the above technical features or their equivalent features without departing from the above disclosed concept, for example, the technical solution formed by replacing the above features with (but not limited to) technical features with similar functions disclosed in present disclosure.

Additionally, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in a plurality of embodiments alone or in any suitable sub-combination.

Although the subject matter has been described in language specific to structural features and/or logical acts of methods, it should be understood that, the subject matter defined in the appended claims is not necessarily limited to the specific features or acts described above. On the contrary, the specific features and actions described above are only example forms for realizing the following claims.

What is claimed is:

1. A video generation method, comprising:
  acquiring a first video;
  performing an effect processing on the first video to obtain a second video;
  superimposing dynamic images on the second video to obtain a third video, wherein the dynamic images present related information corresponding to the first video; and
  obtaining a fourth video based on the first video and the third video, wherein an image of the fourth video comprises a first image and a second image, the first image comprises an image of the first video, and the second image comprises an image of the third video.

2. The method according to claim 1, wherein acquiring the first video comprises:
  adjusting a size of an original video according to a preset size to acquire the first video.

3. The method according to claim 1, wherein the dynamic images are obtained by:
  acquiring the related information, and determining a display mode of the related information, a display area of the related information and a display time of the related information; and
  obtaining the dynamic images according to the related information, the display mode, the display area and the display time.

4. The method according to claim 3, wherein determining the display mode of the related information comprises:
  determining the display mode of the related information based on a type of the related information or a content of the related information.

5. The method according to claim 1, wherein a video size of the fourth video is matched with a size of a video display area of an information flow, and the first video, the second video, the third video, and the fourth video are configured to be displayed in the video display area of the information flow.

6. The method according to claim 1, wherein the effect processing comprises a Gaussian blur special effect processing.

7. An electronic apparatus, comprising:
  one or more processors;
  a memory; and
  one or more application programs, wherein the one or more application programs are stored in the memory and configured to be executed by the one or more processors, and the one or more application programs are configured to execute the method according to claim 6.

8. A non-transitory computer-readable storage medium, wherein a computer program is stored on the non-transitory computer-readable storage medium, and while the computer program is executed by a processor, the method according to claim 6 is implemented.

9. The method according to claim 1, wherein obtaining the fourth video based on the first video and the third video comprises:
splicing an image of the first video with an image of the third video to obtain an image of the fourth video.

10. An electronic apparatus, comprising:
one or more processors;
a memory; and
one or more application programs, wherein the one or more application programs are stored in the memory and configured to be executed by the one or more processors, and the one or more application programs are configured to execute the method according to claim 1.

11. A non-transitory computer-readable storage medium, wherein a computer program is stored on the non-transitory computer-readable storage medium, and while the computer program is executed by a processor, the method according to claim 1 is implemented.

12. A video playing method, comprising:
playing an original video in a display interface of an information flow, and playing a fourth video in the display interface of the information flow in response to meeting a predetermined condition, wherein an image of the fourth video comprises a first image and a second image, the first image comprises an image of a first video, and the second image comprises an image of a third video;
wherein the first video is a video obtained by adjusting a size of the original video according to a preset size; a second video is a video obtained by performing an effect processing on the first video; the third video is a video obtained by superimposing dynamic images on the second video, and the dynamic images present related information corresponding to the first video; and the fourth video is a video obtained based on the first video and the third video.

13. The method according to claim 12, wherein the predetermined condition comprises:
a playing time of the original video reaching a predetermined time, and/or
a predetermined object being detected during a process of playing the original video.

14. The method according to claim 12, wherein the fourth video comprises a first preset control, and the first preset control is configured to link to a network address corresponding to the related information, and the method further comprises:
in a process of playing the fourth video, in response to receiving a trigger operation for the first preset control input by a user, acquiring a detailed information page corresponding to the related information based on the network address and displaying the detailed information page.

15. The method according to claim 12, wherein the fourth video comprises a second preset control, and the second preset control is configured to close the fourth video, and the method further comprises:
in a process of playing the fourth video, closing the fourth video in response to receiving a trigger operation for the second preset control input by a user.

16. A video generation device, comprising:
an acquisition module, configured to acquire a first video;
a processing module, configured to perform an effect processing on the first video to obtain a second video;
a superimposition module, configured to superimpose dynamic images on the second video to obtain a third video, wherein the dynamic images present related information corresponding to the first video; and
a splicing module, configured to obtaining a fourth video based on the first video and the third video, wherein an image of the fourth video comprises a first image and a second image, and the first image comprises an image of the first video, and the second image comprises an image of the third video.

17. A video playing device, comprising:
a playing module, configured to play an original video in a display interface of an information flow, and play a fourth video in the display interface of the information flow in response to meeting a predetermined condition, wherein an image of the fourth video comprises a first image and a second image, the first image comprises an image of a first video, and the second image comprises an image of a third video;
wherein the first video is a video obtained by adjusting a size of the original video according to a preset size; a second video is a video obtained by performing an effect processing on the first video; the third video is a video obtained by superimposing dynamic images on the second video, and the dynamic images present related information corresponding to the first video; and the fourth video is a video obtained based on the first video and the third video.

* * * * *